(12) United States Patent
Simpson et al.

(10) Patent No.: US 11,182,448 B1
(45) Date of Patent: Nov. 23, 2021

(54) CONTENT QUALITY MANAGEMENT SERVICE

(71) Applicant: INTUIT INC., Mountain View, CA (US)

(72) Inventors: Heather Elizabeth Simpson, Sunnyvale, CA (US); Xiangling Meng, Mountain View, CA (US); Sameeran Kunche, Milpitas, CA (US); Nhung Ho, Redwood City, CA (US); Vincent Billaut, Cambridge, MA (US)

(73) Assignee: INTUIT INC., Mountain View, CA (US)

( * ) Notice: Subject to any disclaimer, the term of this patent is extended or adjusted under 35 U.S.C. 154(b) by 222 days.

(21) Appl. No.: 16/526,726

(22) Filed: Jul. 30, 2019

(51) Int. Cl.
  *G06F 16/00* (2019.01)
  *G06F 16/9536* (2019.01)
  *G06F 16/9032* (2019.01)
  *G06N 20/20* (2019.01)

(52) U.S. Cl.
  CPC .... *G06F 16/9536* (2019.01); *G06F 16/90332* (2019.01); *G06N 20/20* (2019.01)

(58) Field of Classification Search
  CPC .......... G06F 16/9536; G06F 16/90332; G06N 20/20
  See application file for complete search history.

(56) References Cited

U.S. PATENT DOCUMENTS

| 8,442,984 | B1 * | 5/2013 | Pennock | G06Q 10/0639 707/748 |
| 9,189,514 | B1 * | 11/2015 | Myslinski | G06F 16/3331 |
| 2004/0254808 | A1 * | 12/2004 | Bennett | G06Q 30/04 705/26.1 |
| 2013/0097178 | A1 * | 4/2013 | Song | G09B 7/02 707/748 |
| 2014/0272909 | A1 * | 9/2014 | Isensee | G09B 7/02 434/362 |
| 2018/0144314 | A1 * | 5/2018 | Miller | G06Q 20/14 |
| 2019/0005020 | A1 * | 1/2019 | Gregory | G06F 40/295 |
| 2020/0110943 | A1 * | 4/2020 | Gunawardena | G06F 16/7328 |
| 2020/0168231 | A1 * | 5/2020 | Alagianambi | G10L 25/63 |
| 2020/0210490 | A1 * | 7/2020 | Hutchins | G06K 9/00979 |

(Continued)

OTHER PUBLICATIONS

Chirag Shah and Jefferey Pomerantz. 2010. Evaluating and predicting answer quality in community QA. In Proceedings of the 33rd international ACM SIGIR conference on Research and development in information retrieval (SIGIR '10). Association for Computing Machinery, New York, NY, USA, 411-418. (Year: 2010).*

(Continued)

*Primary Examiner* — Syed H Hasan
(74) *Attorney, Agent, or Firm* — Patterson + Sheridan, LLP

(57) ABSTRACT

Certain aspects of the present disclosure provide techniques for determining content quality of a set of content item based on generating a score for each content item. An example technique includes using a trained content quality model to generate the score for each content item component. In such example, the model is trained using a calculated set of features associated with text and metadata of a content item in a training data set as well as a quality label for the content item. The model is trained by associating the set of features with the quality label for each content item in the training data.

20 Claims, 7 Drawing Sheets

(56) References Cited

U.S. PATENT DOCUMENTS

2020/0364404 A1* 11/2020 Priestas ................ G06K 9/6267
2020/0372067 A1* 11/2020 Otero .................... G06F 3/0482

OTHER PUBLICATIONS

Assale et al., The Revival of the Notes Field: Leveraging the Unstructured Content in Electronic Health Records. (Year: 2019).*
Balyan et al., Combining Machine Learning and Natural Language Processing to Assess Literary Text Comprehension. (Year: 2017).*

* cited by examiner

USER 1

Broken Connection to Bank

I just started with ABC last week and am already having issues. I am being told by support that the reason I cannot update my bank account information is because there is an on-going investigation at the bank and "they don't know when it will be fixed." Is this system wide? Is this a common issue? How long will it take to fix?

LIKE    REPLY 3 comments

USER 2

Re: Broken Connection to Bank

Thank you for calling and posting to let us know what happened to your bank connection.

By calling us, you are able to be included in the notification list. While there is no current time frame for the investigation to conclude, but through the notification list, we will automatically inform you of any updates once they are available.

Thank you for your patience and understanding.

LIKE    REPLY

FIG. 4

CONTENT QUALITY MANAGEMENT SERVICE

INTRODUCTION

Aspects of the present disclosure relate to a method and system for managing content items in order to promote the display and generation of high quality content. In particular, content quality scores are generated for each content item by an ensemble model to determine the overall quality of a content item.

BACKGROUND

Online user communities provide a forum for users to interact with one another. Organizations often establish user communities for products or services offered by the organization as a way to engage users and/or provide technical support to users. Users can include customers, potential customers, technical support agents, and others capable of generating content for the user community. Content generated in these communities may promote, troubleshoot issues for, or provide information about a product or service provided by the organization. In some cases, user communities allow users to generate content items including questions to pose to other users of the user community and replies to questions posted. For example, a user that has purchased a software product can pose a question in a user community requesting assistance on how to use a feature of the product and/or service offered by the organization. After the question (e.g., a content item) is generated in the user community, the question can be stored in a database. The question then can be viewed by members of the user community upon request, access (e.g. logging in) to the user community, and the like. Once the question is posted, the user may get answers to the question posted. In some cases, the answer(s) provided to the user may have been previously generated for a similar question posted and retrieved to display to the user.

However, within a user community, there may be a number of content items that are low quality, containing characteristics that make the content item undesirable for a user. Characteristics of low quality content items include spelling mistakes, poor punctuation usage, grammatical errors, convoluted language, and wrong answers. If low quality content items are displayed to a user (e.g., in response to a legitimate user question), navigating through such low quality content items may cause confusion or frustration for the user, or otherwise create a negative user experience. User communities containing a high number of low quality content items often result in decreased engagement within the user community, increased engagement via costly customer care agent based support, as well as a decrease in perceived credibility of the organization associated with the content items and the user community. This can further negatively impact product sales and/or use of services, which results in reduced profits and decreased member engagement for the organization.

Conventional methods and systems fail to address overall quality of generated content. Some organizations employ moderators to fix or remove low quality content and create high quality content, but this approach is resource-intensive, costly, and lacks a consistent process for identifying low quality content item and generating high quality content. Traditional automated methods and systems also fail, as they only address individual quality features rather than comprehensively addressing overall quality of a content item. For example, existing methods and systems fail to provide a service that addresses the overall quality of a content item, including identifying spelling, grammar, and punctuation errors, determining accuracy of content items, and reviewing content items for clarity. Further, existing methods and systems do not display content items according to the overall quality of the content item. Additionally, existing methods and systems do not rank a content item against other content items based on the overall quality of the content item.

A solution is needed to create a consistent process for providing high quality content.

BRIEF SUMMARY

Certain embodiments provide a method for managing display of content items based on determining a quality score for each content item. The method generally includes receiving a content item. The method further includes retrieving an ensemble model comprising a combination of trained models. The method further includes for each component of the content item, generating, based on features, a score via a trained model of the ensemble model, wherein the score is a probability the content item component matches a quality. The method further includes generating via the ensemble model a recommendation for the content item based on evaluating the score for each content item component, wherein the recommendation includes a determination on how to handle the content item. The method further includes receiving a request for the content item. The method further includes identifying a first set of keywords from the request based on a natural language analysis. The method further includes determining a first set of content items corresponding to the request based on the first set of keywords from the request matching a second set of keywords associated with the first set of content items, the first set of content items including the content item. The method further includes determining, based on the recommendation, to display the content item. The method further includes displaying the content item.

Other embodiments provide systems configured to perform methods for determining a quality score for each content item, such as the aforementioned method, as well as non-transitory computer-readable storage mediums comprising instructions, that when executed by a processor of a server, cause the server to perform methods for determining a quality score for each content item.

Other embodiments provide systems configured to perform a method for training models of an ensemble mode to manage content items. The system generally includes a processor. The system further includes a memory storing instructions which when executed by the processor perform a method for training models of an ensemble model to manage content items. The method performed includes calculating a set of feature values for each content item component in a training data set, wherein each feature value is a numerical representation of an aspect of quality including a sentiment score generated by a sentiment analysis, a number of words matching a set of words on a blocklist, a number of spelling errors, punctuation errors, and grammar errors, a measurement of syntactic complexity, an average word frequency, a number of question keywords, a number of words in the content item component, a number of links within the content item component, a number representing an age of the content item component, a number representing an age of an account that generated the content item component, and a number representing content items associated with the account. The method performed further includes retrieving a quality label generated by a content annotation tool for each content item component in the training data set. The method performed further includes associating the set of feature values and the quality label for each content item component in the training data.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts an example of a content item.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
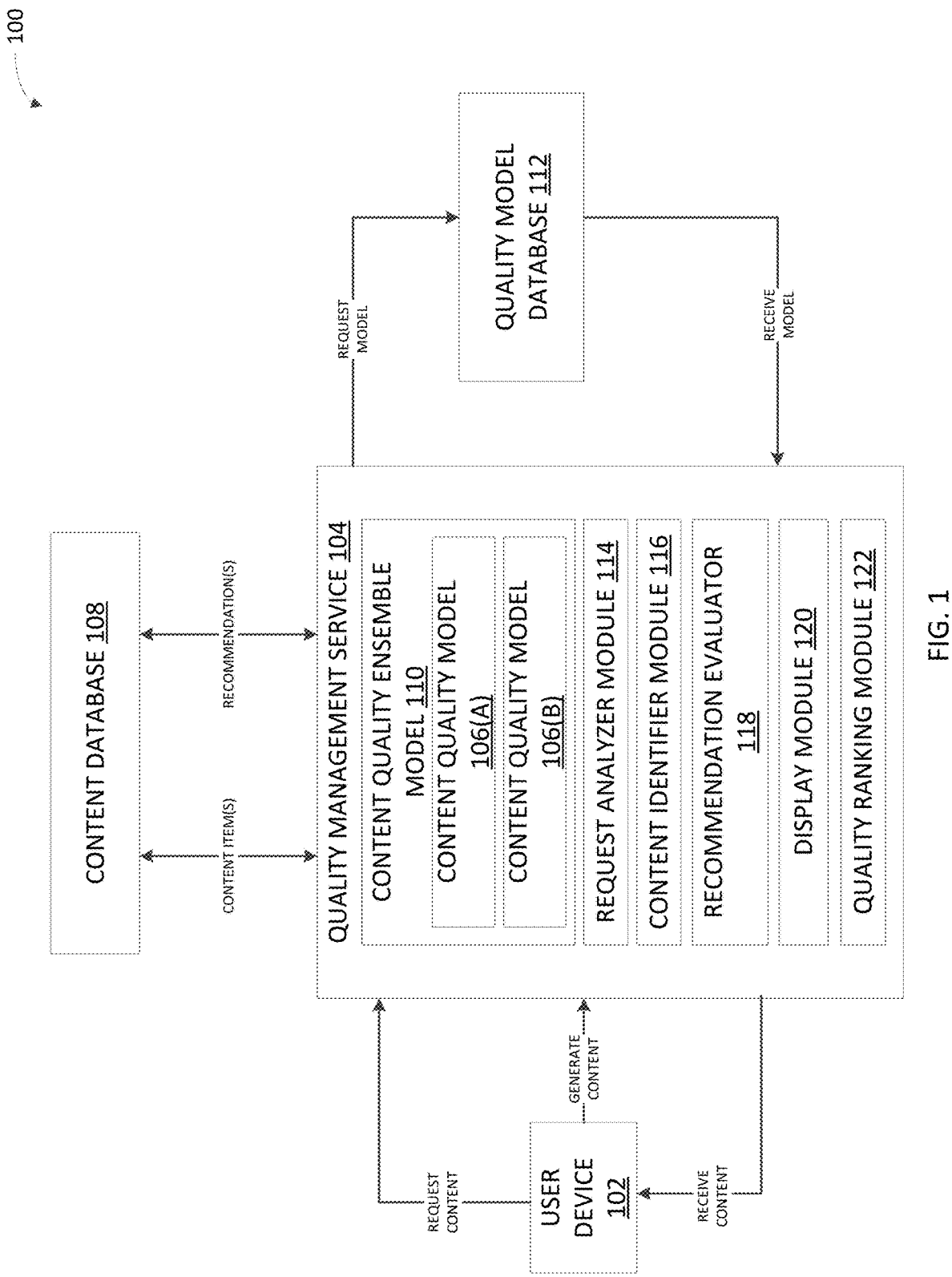
FIG. 1 depicts an example computing environment for managing display of content items based on determining a quality score for each content item.

Aspects of the present disclosure provide apparatuses, methods, processing systems, and computer readable mediums for managing display of content item(s) based on the overall quality of each content item. A content item can comprise a set of components, and as such, a score (e.g., a quality score) is generated for each content item component by a content quality ensemble model comprising a set of content quality models. For example, a content item can be a question-answer dialog, such that the question is one component of the content item and each answer is a separate content item component.

In order to generate a quality score for a content item, a content quality ensemble model ("ensemble model") comprising a content quality model for each content item component is trained. Each of the trained content quality models can be a logistic regression model that generates a quality score for the content item component. The quality score generated by each content quality model is the probability that a content item component is a particular quality (e.g., "good" quality or "bad" quality). In some cases, the quality score is a probability the content item component matches a quality label, which indicates a quality.

Each content quality model of the ensemble model is trained to associate content features with a quality using a training data set of content items. In some cases, a content quality model can be a logistic regression model, Naïve Bayes classifier, random forest, boosted trees, and the like.

The training data set can be a set of content items retrieved from a content database. For each content item component in the training data set, the content quality model calculates a set of feature values. A feature value is a numerical representation of an aspect (or dimension) of quality. Once each feature value for a content item component is calculated, a quality label is retrieved that describes the overall quality of the content item component. For example, a content item component in the training data set may be predetermined to be of "good" quality. In some cases, the predetermined quality label is generated by a content annotation tool. In other cases, the predetermined quality label is generated by a reviewer, manually reviewing each content item component to train the content quality ensemble model.

Once the quality label is retrieved, each content quality model of the ensemble model is trained to associate features of the content item component with the quality label. By training each content quality model to associate features with quality, the ensemble model comprising the trained content quality models can determine the quality (e.g., a quality class or category) of a content item when the ensemble model is implemented based on the features determined from text data and metadata of the content item. After training, the ensemble model including the content quality models can be saved to a model database. In some cases, more than one ensemble model can be saved to a model database based on different combinations of trained content quality models.

An ensemble model can be retrieved to generate a quality score for a corresponding content item. Each content quality model of the ensemble model can generate a score corresponding to the content item component, indicating the probability the content item component is a certain quality based on features of the content item component. For example, each content quality model can take a linear combination of all of the features (such that each feature is multiplied by a coefficient) and transform the linear combination value into a number between 0 and 1 (e.g., by a sigmoid function). The resulting number is the probability as estimated by the content quality model that the component is a certain quality (e.g., a quality class or quality category, such as "good" quality, "bad" quality, "okay" category, etc.), based on the content quality model associating the feature values with a quality label during training.

The quality score generated by each content quality model for content item components is the probability that the content item component matches the quality label used in training of the content quality model, as such, the score is a probability of quality. Further, the quality score generated comprehensively reflects the quality of the content item component based on the set of features associated with that content item component. The ensemble model can determine based on the quality scores generated by each content quality model and predetermined rules what the quality is of a content item and how the content item should be handled (e.g., whether the content item should be displayed, hidden, removed, etc.). For example, if each quality score generated by content quality models of the ensemble model is below a required threshold, then the ensemble model can decide to hide the content item. In another example, if the average of the quality scores generated by the content quality models is above a required threshold requirement, then the ensemble model can decide to display the content item.

In some cases, the trained content quality models of an ensemble model can each generate a quality score and the ensemble model can determine how to handle content items through batch processing of content items. For example, a set of content items can be retrieved and the quality scores for each component of each content item can be generated by the trained quality models. Based on the scores generated, the ensemble model can determine how to handle the content item and generate a recommendation. The recommendation can be stored with the content item in the database. In the instance the content item is retrieved upon request, the quality management service can execute the determination of the ensemble model (e.g., a recommendation to display the content item, hide the content item, remove the content item, edit the content item, etc.).

In other cases, the trained content quality models of the ensemble model can generate quality scores and the ensemble model can determine how to handle the content item in real time through a stream process as a content item is generated. In such cases, a content item is generated in a user community by an authorized user. An authorized user can be associated with an authorized account or can receive authorization from an authorized account to generate content items. For example, in a user community associated with an organization, an employee of the organization can be authorized to generate content, and such authorization can be reflected in the employee's account for the user community.

For example, after generating a quality score for each content item component, the ensemble model can determine how to handle the content item based on quality scores generated and predetermined rules (e.g., threshold requirements). In some cases, if the average of the quality scores for the content item meets the threshold requirement, then the content item is added to the content database for the user community. In other cases, if one content item component has a quality score that is below a threshold requirement, then the ensemble model can decide to hide the content item. In some cases, the ensemble model can block the content item from being added to the user community (e.g., based on the average of quality scores, a single quality score, etc.).

In one embodiment, the quality management service can receive a request for a content item from a user. In such cases, the quality management service determines and retrieves a set of content items based on analyzing the received request to identify keywords in the request. For example, the quality management service can use natural language processing to identify keywords associated with the request. After determining the set of keywords associated with the request, a set of related content items corresponding with the request is then determined based on matching the set of keywords from the user request to keywords of content items. The quality management service retrieves the content items from a content database along with the corresponding determination by the ensemble model on how to handle the content item.

After the quality management service retrieves the set of content items with the corresponding determinations, the quality management service can execute the decision determined by the ensemble model. For example, the quality management service can either display content items, hide content items, remove content items from the content database, or send content items for editing. In some cases, the content items can be displayed to the user in a ranked order based on the quality score generated by the content quality models. In such cases, the content item with the highest quality scores can be ranked first.

In some cases, content items that fail to meet the content quality requirement can be removed from the database. For example, the ensemble model can generate a recommendation to remove a content item from the content database based on the quality score generated by the content quality models. In the instance the content item is retrieved with the recommendation (e.g., through batch processing), the quality management service can present the recommendation to an authorized user. In such example, upon receiving approval from the authorized user, the content item can be removed from the content database by the quality management service.

Example Computing Environment for Managing Content Item Display

FIG. 1 depicts an example computing environment 100 for managing the display of high quality content items based on determining quality scores. The example computing environment 100 comprises a user device 102, a quality management service 104, a content database 108, and a quality model database 112.

A quality management service 104 can determine whether to display content items based on the quality of the content item. A content item can comprise of a set of components. For example, in an online forum setting, a content item can include a question posted by one user and each reply posted to the question. The question and each answer in such instance are separate components of the content item.

A content quality ensemble model 110 ("ensemble model") can determine how content items should be handled (e.g., whether a particular content item should be displayed to a user, hidden from a user, deleted, edited by a user, etc.). The ensemble model 110 comprises a combination of trained content quality models. A content quality model can be a logistic regression model, a Naïve Bayes classifier, random forest, boosted trees, or other classification algorithms capable of classifying data elements. Once trained, a content quality model can generate a quality score for a content item component.

The quality score for each content item component is based on identifying and extracting a set of features from the text data and metadata associated with each content item component. Features, which represent dimensions of quality, can include sentiment, word count, the presence of errors (e.g., spelling, grammar, punctuation, etc.), age of content item, and other dimensions representing quality. Once the set of features are identified and extracted, the content quality model can calculate the feature value for each feature in order to generate the quality score. For example, each content quality model can take a linear combination of all of the features (such that each feature is multiplied by a coefficient) and transform the linear combination value into a number between 0 and 1 (e.g., by a the sigmoid function). The resulting number is the probability as estimated by the content quality model that the component is a certain quality (e.g., "good" quality, "bad" quality, "okay" quality, etc.). In some cases, the accuracy of the content quality models may have a positive linear relationship with the number of features taken in account by the content quality models.

Once all of the scores are generated for each component by the content quality models, the ensemble model 110 can determine based on the quality scores generated how to handle the content item. For example, the ensemble model 110 can determine the average of the quality scores meets a threshold requirement (e.g., predetermined rule), so the ensemble model 110 can generate a notification that the content item should be displayed by the quality management service 104. In another example, the ensemble model 110 can determine that one component of the content item is below the threshold requirement, so the ensemble model 110 can generate a notification that the content item should be hidden by the quality management service 104.

In some cases, the ensemble model 110 of the quality management service 104 generates the quality score through batch processing. For batch processing, the quality management service 104 retrieves a set of content items from a content database 108. The quality management service 104 then retrieves an ensemble model 110 comprising a plurality of content quality models 106 from quality model database 112.

Once each content quality model 106 generates the quality score for each corresponding content item component, the ensemble model 110 determines how to handle the content item based on each score generated (e.g., display content item, hide content item, edit content item, remove content item, etc.). In some cases, a recommendation (or a notification) is generated and stored with the content item. When the content item is retrieved by the quality management service 104, the recommendation evaluator 118 of the quality management service 104 can review the recommendation associated with the content item, and the quality management service 104 can execute the recommendation.

In one embodiment, the quality management service 104 can receive a request from a user via a user device 102 for a content item. The request analyzer module 114 of the quality management service 104 can identify a set of keywords associated with the request in order to determine which content items to retrieve from the content database 108. For example, the request analyzer module 114 can use natural language processing to identify keywords in the request. Based on the identified keywords, the content identifier module 116 can identify content items in the content database 108 associated with the keywords of the request. For example, the content identifier module 116 can match the keywords of the request to keywords of content items to determine which content items correspond to the request. After identifying the content items, the quality management service can retrieve the content items and corresponding recommendations of the content items generated by the ensemble model 110.

Once the content items corresponding to the request are retrieved, a recommendation evaluator 118 can determine how to handle the content item based on the corresponding recommendation (e.g., indicating the ensemble model's determination) associated with the content item.

For example, if the ensemble model 110 indicates displaying the content item, then the display module 120 can display the content item (e.g., upon a user request). In another example, if the ensemble model 110 indicates that the content item requires editing (e.g., based on threshold requirements of predetermined rules), then the display module 120 can display the content item for a user to edit. In another example, the recommendation evaluator 118 can hide a content item, preventing such content item from being displayed.

As another example, the recommendation evaluator 118 can determine the recommendation corresponding to the content item is to remove the content item from the content database 108. For example, based on the predetermined rules and quality scores generated by the content quality models 106, the ensemble model 110 can determine that the content item (and components thereof) fails to meet the threshold requirement and as such should be removed from the content database. In such cases, the display module 120 can display generated recommendation (e.g., to an authorized user). In such example, upon receiving approval from the authorized user, the content item can be removed from the content database by the quality management service 104.

In other cases, the quality management service 104 can retrieve an ensemble model 110 comprising trained content quality models 106 to generate quality scores in real time through a stream process as a content item is generated and received by the quality management service 104. For example, the quality management service 104 can receive a content item generated by a user device 102. Upon receiving the content item generated by the user device 102, the quality management service 104 can retrieve an ensemble model 110 to generate a quality score for each component of the content item via a corresponding content quality model 106 of the ensemble model 110. After generating the content quality score for each component, the ensemble model 110 determines how to handle the content item (e.g., add the content item to the content database, block the content item from the content database, send a request to the user to edit the content item, etc.).

In some cases, the content items for display can be ranked prior to displaying the content items to the user. For example, a quality ranking module 122 can rank each content item based on the quality scores corresponding to the components of the content item, such that the content item with the highest overall quality scores can be ranked first. In other cases, content items that fail to meet the threshold requirements can be edited by the user generating the content item or an authorized user (e.g., a technical expert of the product and/or service). For example, if the ensemble model 110 of the quality management service 104 determines that the content item fails content quality requirement, then a recommendation can be generated and sent to the user (e.g., an authorized user) to edit the content item to meet the threshold requirement and store in the content quality database. In such instances, the quality management service 104 can receive the edited content item and store the edited content item with the corresponding recommendation generated (e.g., through stream processing).

Over time, the threshold requirement can be adjusted in order to increase the quality level of the content items displayed. For example, the threshold requirement can increase from a first time to a second time. As a result of increasing the threshold requirement, a content item with quality scores meeting the threshold requirement at a first time may not meet the threshold requirement at a second time. In such cases, the content item can be removed from the content database. In another example, the content quality categories that meet the content quality requirement for display can change from "good" and "okay" content categories to the content quality requirement of content items in the "good" content category.

Example Flow Diagram for Training a Content Quality Model

Figure 2:
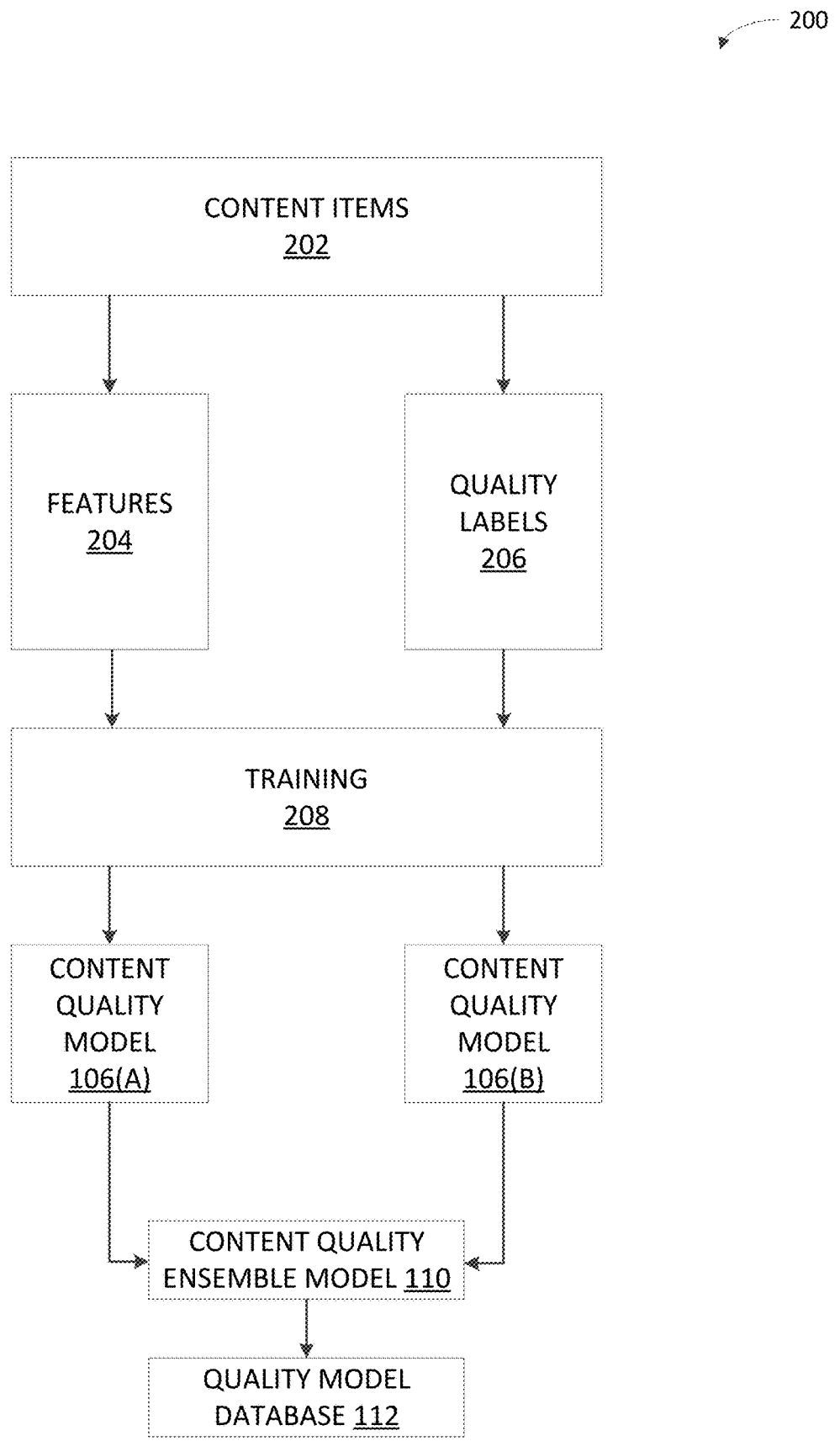
FIG. 2 depicts an example flow diagram of the training of a content quality model for determining a quality score for each content item.

FIG. 2 depicts an example diagram 200 of the training of content quality models that comprise the ensemble model for determining a quality score for each content item, as described with respect to FIG. 1.

In order to implement ensemble models capable of determining whether to display content items based on quality, a set of content quality models that comprise the ensemble model are trained to generate quality scores for each content item component. A content quality model is trained using training data for each type of content item component. The training data comprises content items 202. The content items 202 include a set of features 204, each of which has a numerical value to represent an aspect of quality. As part of training, a set of feature values (e.g., featurization data) are calculated for each content item component. The features values are calculated based on the text data and metadata associated with each content item component.

For example, calculated feature values include: a sentiment score generated by sentiment analysis, a number of words matching a set of words on a blocklist, a number of spelling errors, a number of punctuation errors, a number of grammar errors, a measurement of syntactic complexity, an average word frequency, a number of question keywords (e.g., "who," "what," "where," "when," "why," "how"), a number of words in the content item component, a number of links within the content item component, a number representing an age of the content item component, a number representing an age of an account that generated the content item component, and a number representing content items associated with the account.

The feature values can also include a standard readability score (e.g., calculated by Fleisch-Kincaid readability score formula), a standard readability score estimating grade level of writing (e.g., calculated by a SMOG index formula), a ratio of number of links to length of content, a number of words in bold text, a number of words underlined, detection of spam, detection of atypical grammar and/or non-standard capitalization, and the like.

In addition to calculating feature values for the features 204, the training of the content quality models for content item components includes retrieving quality labels 206 for the content item (and components thereof). In some cases, the quality labels 206 are predetermined and generated by a content annotation tool. In other cases, the quality labels 206 are generated manually after review of the content item by a human reviewer.

As part of training 208, the calculated features 204 are associated with the retrieved labels 206 for each content item 202, respectively. Through training 208, a content quality model is generated for each content component. For example, a content quality model 106(A) is generated for calculating quality scores of a first content item component, and a content quality model 106(B) is generated for calculating quality scores of a second content item component. The content quality models 106 that are generated through training can be a logistic regression model, Naïve Bayes classifier, random forest, boosted trees, or other classification algorithm capable of accurately generating a quality score.

The trained content quality models 106 can be combined to produce an ensemble model 110 capable of determining whether to display content items based on the quality scores generated by the content quality models. In some cases, more than one ensemble model can be produced based on a different combination of content quality models 106. For example, a first ensemble model 110 can be based on the combination of content quality models 106(A) and 106 (B). A second ensemble model 110 can be based on the combination of content quality models 106 (A), 106 (B), and 106 (C). Each ensemble model 110 is stored in a quality model database 112. The ensemble model 110 can then be retrieved from quality model database 112 to generate a quality score for a content item. For example, if content items include both a first content item component and a second content item component, then the content quality ensemble model 110(A) and content quality ensemble model 110(B) can both be retrieved to generate a quality score for each content component.

Example Flow Diagram for Batch Processing of Content Quality Scores

Figure 3A:
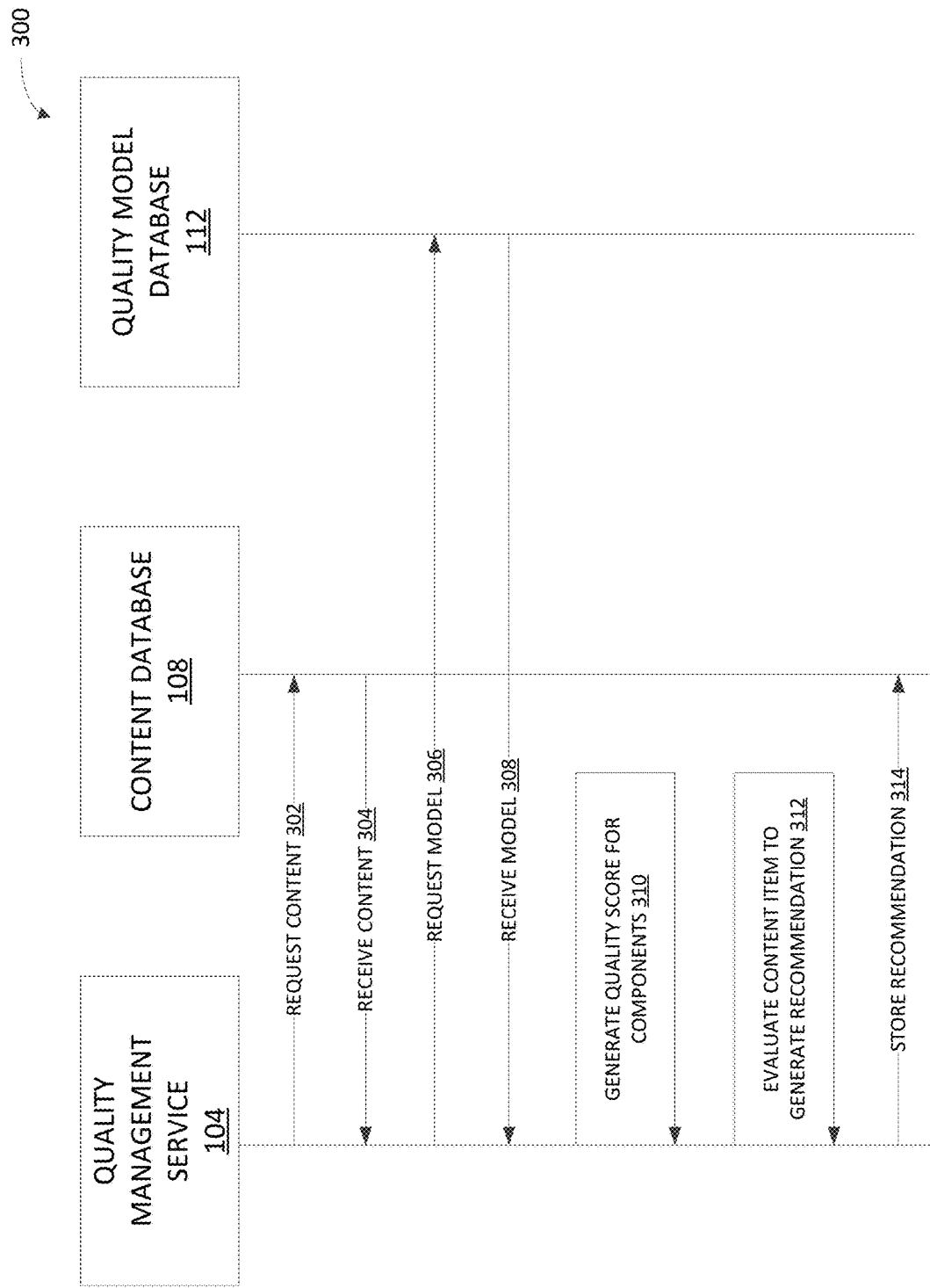
FIG. 3A depicts an example flow diagram for the batch processing of content quality scores.

FIG. 3A depicts an example flow diagram 300 for batch processing of content items to generate content quality scores, as described with respect to FIGS. 1-2.

The example flow diagram 300 begins with quality management service 104 requesting content 302 from a content database 108. After receiving content 304 from the content database 108, the quality management service 104 requests an ensemble model 306 from quality model database 112. The ensemble model is combination of content quality models trained to generate a quality score for each component of the received content item based on features of the content item component.

After receiving the ensemble model 308, the quality management service 104 generates a quality score for each component of the content items 310 based on the features of the component. For example, the features of a component can be input to the corresponding content quality model to generate a score. Once a quality score is generated for each component, the content quality model can take a linear combination of all of the features (such that each feature is multiplied by a coefficient) and transform the linear combination value into a number between 0 and 1 (e.g., by a sigmoid function). The resulting number is the probability as estimated by the content quality model that the component is a certain quality. Each content quality model of the ensemble model generates a quality score for the component.

The ensemble model of the quality management service 104 can evaluate the content item to generate a recommendation 312. The ensemble model can evaluate the quality stores generated by the content quality models and determine the status of how to handle the content item. For example, a recommendation (e.g., a notification) can be generated indicating whether to display the content item, remove the content item, edit the content item, or display the content item. The recommendations generated are stored 318 in the content database 108 with the corresponding content item.

In some cases, when the content item is retrieved (e.g., upon request), the corresponding recommendation is also retrieved and executed by the quality management service 104. For example, if the recommendation is to display the content item, the quality management service 104 displays the content item. If the recommendation is to remove the content item, the quality management service 104 can display the recommendation to an authorized user to receive authorization to remove the content item from the content database. If the recommendation is to edit the content item, the quality management service 104 can display the content item to an authorized user and request the authorized user edit the content item. If the recommendation is to hide the content item, the quality management service 104 can block the display of the content item.

Example Flow Diagram for Stream Processing of Content Quality Scores

Figure 3B:
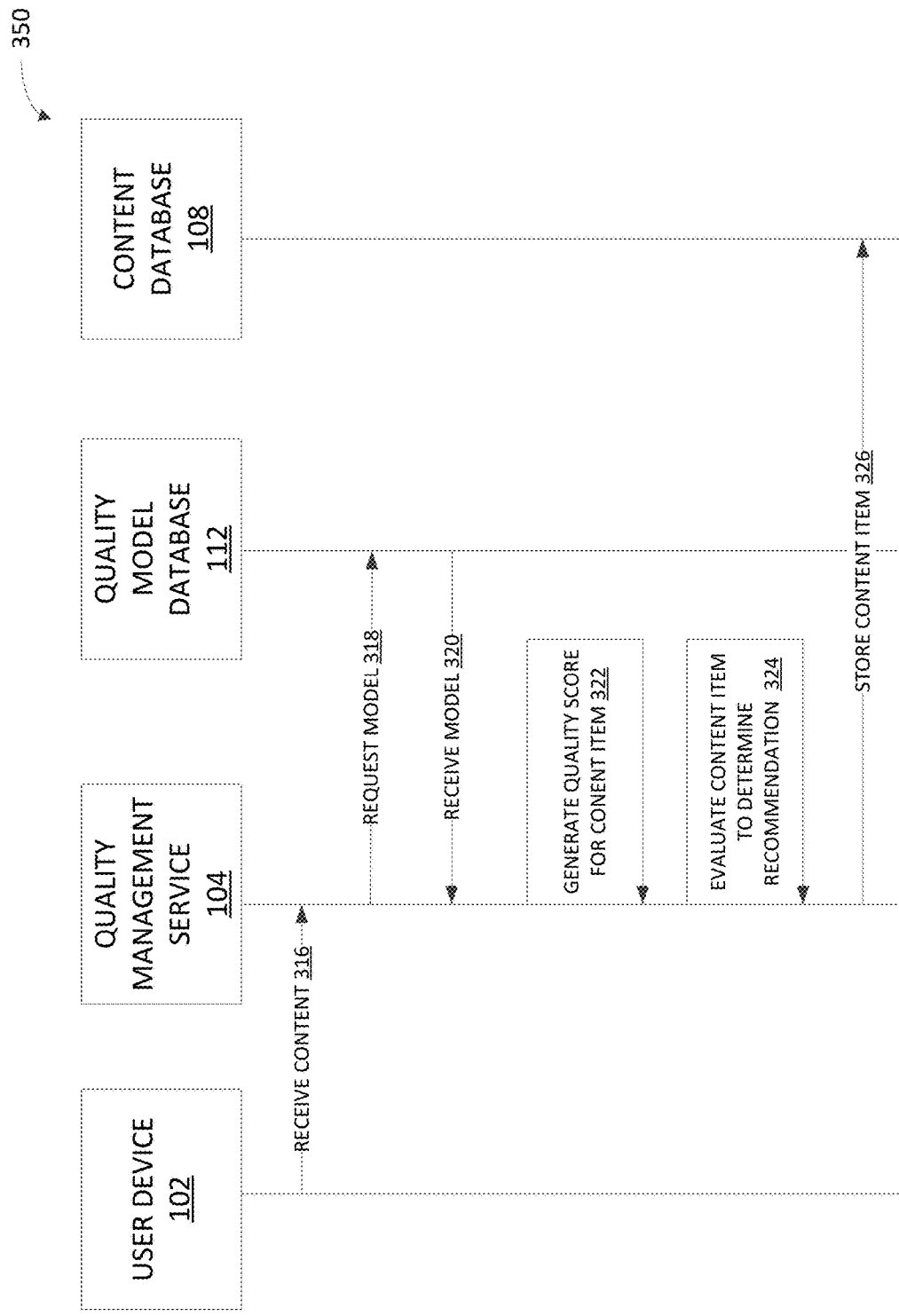
FIG. 3B depicts an example flow diagram for the stream processing of content quality scores.

FIG. 3B depicts an example flow diagram 350 for stream processing of content items to generate quality scores, as described with respect to FIGS. 1-2.

The example flow diagram 350 begins with the quality management service 104 receiving content 316 from user via user device 102. The user may be a member of a user community. For example, the user may be a client submitting a question about a product or service to a related public online forum in the user community. In such example, the content received by the quality management service 104 is the question generated. In other cases, the user can be an authorized user (e.g., a technical expert) generating a reply to questions posted in the user community.

Based on the content received, the quality management service 104 requests a trained ensemble model 318 from quality model database 112. The ensemble model comprises a combination of content quality models trained to generate a quality score for the corresponding content item component based on features of the component. After receiving the ensemble model 318, the content quality models of the ensemble model generate a quality score 320 for each component of the content item. The quality management service 104 via the ensemble model then evaluates the quality scores to generate a recommendation 324 (e.g., how to handle the generated content item). For example, if the quality scores meets the threshold requirement (e.g., based on an average of component quality scores, an aggregate of component quality scores, or a single component quality score), the quality management service 104 can then generate and execute a recommendation to store the content item 324 in the content database 108.

Example of a Content Item

FIG. 4 depicts example content item 400, as described with respect to FIGS. 1-3.

As depicted, content item 400 include multiple components: subject 404 of question 402, details 406 of question 402, and reply 408. The content item 400 depict an interaction between users. For example, the interaction may take place in an online forum of a user community. As part of the user community, the content item may be stored in a content database for later display to a user.

A quality management service may train a content quality ensemble model to generate a quality score for each component of the content item 400. In some cases, the content quality models of the ensemble model can generate a content quality score for each component. For example, the features of each component (e.g., based on text data and metadata) can be input to the corresponding content quality model. A score is generated for the component. In the case where there are multiple replies (e.g., 408(A), 408(B), 408(C), etc.), the entire discussion can inherit the lowest quality score generated. In other cases, the quality scores of the entire discussion can be averaged.

In some cases, two or more content quality ensemble models can each generate a content quality score for a single content item component. For example, a general quality score can be generated and a technical accuracy score can be generated.

Example Method for Managing Content Item Display

Figure 5:
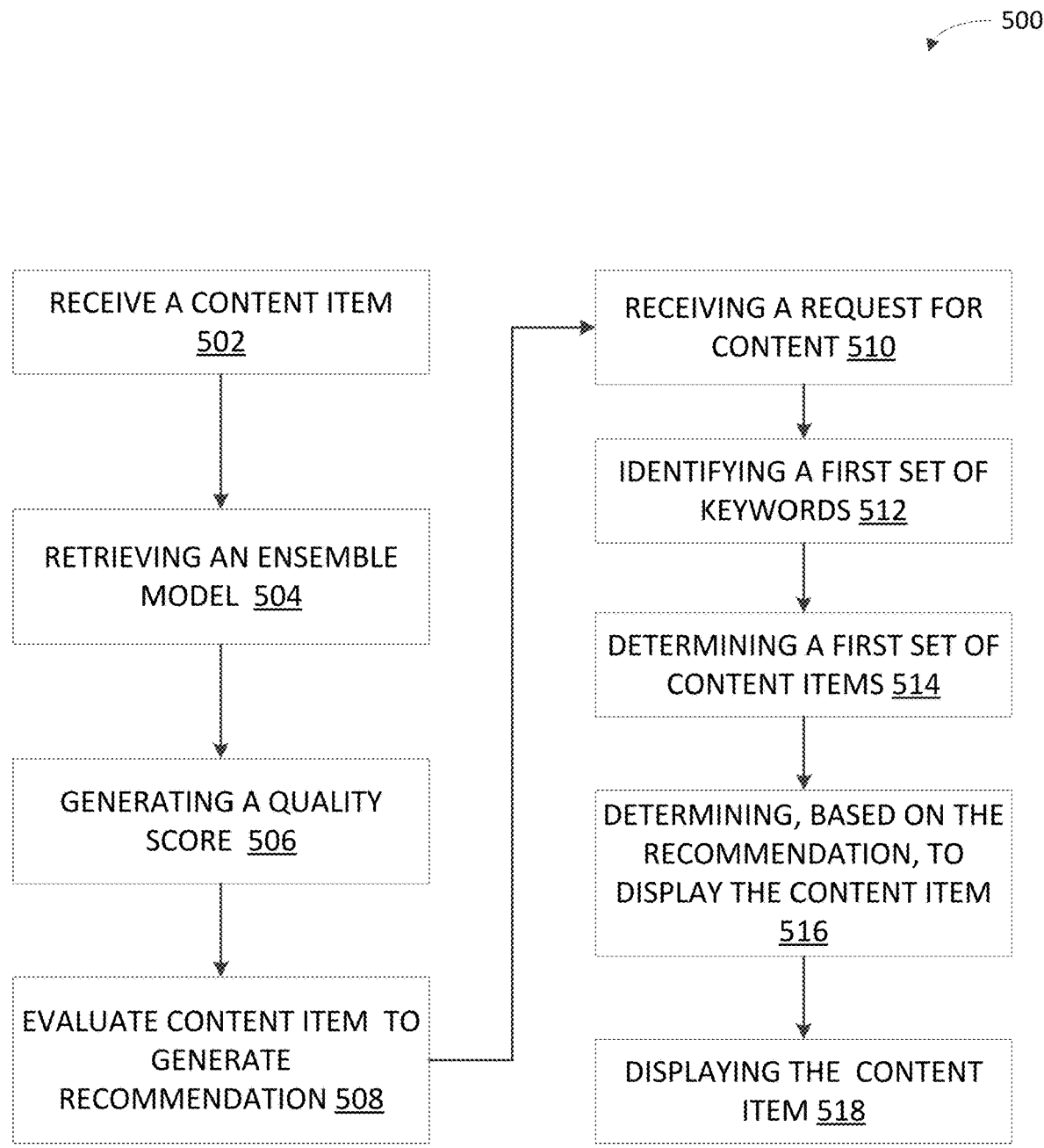
FIG. 5 depicts an example method for managing display of content items based on determining a quality score for each content item.

FIG. 5 depicts an example method 500 for managing display of content items based on a quality score for each content item, as described with respect to FIGS. 1-4.

At step 502, a quality management service receives a content item. Each content item includes a set of features, with each feature representing an aspect of quality of the content item (or components thereof). In some cases, the content item is received by the quality management service as part of stream processing to generate a quality score in real time as the content item is generated. In other cases, the content item is received by the quality management service as part of batch processing to generate quality scores and recommendations to store in a content database. In such cases, the recommendation can be executed by the quality management service when the content item is retrieved (e.g., upon request).

At step 504, the quality management service retrieves an ensemble model comprising a combination of content quality models. The ensemble model capable of generating an accurate quality score for each content item component can be retrieved from a quality model database.

At step 506, the quality management service for each component of the content item generates a score via a trained model of the ensemble model, such that the score generated matches a quality.

Each content quality model of the ensemble model that generates a score is trained on training data (e.g., content items) that include a set of features. Based on the set of features of a content item component in the training data, a set of feature values are calculated, representing a numerical value of a content quality aspect. Additionally, quality labels associated with each content item is retrieved. Training of the content quality ensemble model includes associating the set of features with the quality label.

Once trained, the content quality models can be implemented as an ensemble model to generate content quality scores for corresponding content item components. For example, a trained content quality model can take features of the content item component as inputs and calculate feature values for each feature. For example, the content quality model can determine a sentiment score based on sentiment analysis of the content, calculate a number of errors (e.g., spelling, punctuation, and grammar), identify presence of words (e.g., words matching to a blocklist or question keywords), and determine statistical values associated with the content item (e.g., average word frequency, age of content and/or account that generated the content, etc.). Each feature value, which represents a dimension of quality, is calculated via algorithms.

After the feature values are calculated, the content quality model can generate a quality score representing the probability the content item component corresponds to a quality, having been trained to associate feature values with quality labels indicating a quality of the content item component. For example, the content quality models of the ensemble mode can take the linear combination of each feature, multiplied by a coefficient, and transform the linear combination value into a number between 0 and 1 (e.g., through the sigmoid function). The result value is the probability estimated by the content quality model that the content item component is a particular quality class or category. In some cases, the value of the coefficient can be the result of training the content quality model.

At step 508, the quality management service evaluates the content item to generate a recommendation. For example, after the content quality models of the ensemble model generate a quality score for each component, the ensemble model evaluates the scores to generate a recommendation for handling the content item. In some cases, the average of the quality scores for each component can be considered. In other cases, the lowest quality score of the components of a content item is considered. For example, the recommendation generated can be to display the content item, remove the content item from the content database, edit the content item, or hide the content item.

At step 510, the quality management service receives a request for content (e.g., a content item). In some cases, the request is received from a user via a user device.

At step 512, the quality management service identifies a first set of keywords from the request based on a natural language analysis.

At step 514, the quality management service determines a first set of content items corresponding to the request based on the first set of keywords from the request matching a second set of keywords associated with the first set of content items, the first set of content items including the content item. For example, the set of keywords may be identified through natural language analysis of the request.

At step 516, the quality management service determines, based on the recommendation, to display the content item. In some cases, the quality management service determines to display other content items in the first set of content items based on the recommendation generated for the other content items. In such cases, the content item can be displayed in a ranking order with other content items in the first set of content items that include a recommendation to display.

In other cases, the quality management service determines, based on the recommendation, to hide other content items in the first set of content items. In still other cases, the quality management service can send a notification of the recommendation to a user with the authority to review the content item, based on a recommendation to edit or remove a content item. The authorized user can decide to remove or edit the content item, according to the recommendation. For example, after reviewing the content item, the user can send approval to the quality management service to remove the content item, and the quality management service can remove the content item from the content database.

At step 518, the quality management service displays the content item.

Example Server for Managing Content Item Display

Figure 6:
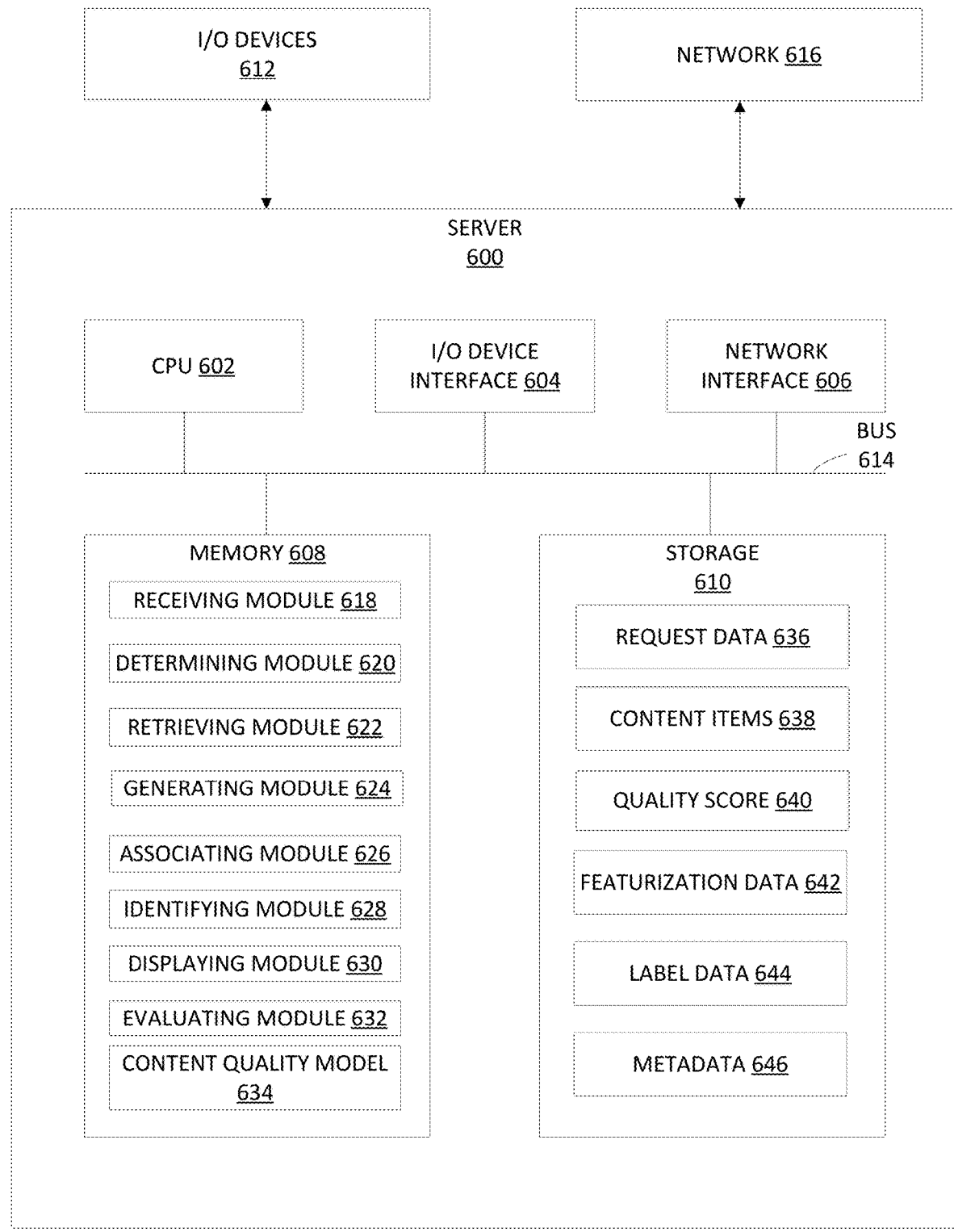
FIG. 6 depicts an example server for managing display of content items based on determining a quality score for each content item.

FIG. 6 depicts an example server 600 that may perform methods described herein, such as the method for determining a quality score for each content item based on a trained content quality model, described with respect to FIGS. 1-5.

Server 600 includes a central processing unit (CPU) 602 connected to a data bus 614. CPU 602 is configured to process computer-executable instructions, e.g., stored in memory 608 or storage 610, and to cause the server 600 to perform methods described herein, for example with respect to FIGS. 1-5. CPU 602 is included to be representative of a single CPU, multiple CPUs, a single CPU having multiple processing cores, and other forms of processing architecture capable of executing computer-executable instructions.

Server 600 further includes input/output (I/O) device(s) 612 and interface(s) 604, which allows server 600 to interface with input/output devices 612, such as, for example, keyboards, displays, mouse devices, pen input, and other devices that allow for interaction with server 600. Note that server 600 may connect with external I/O devices 612 through physical and wireless connections (e.g., an external display device).

Server 600 further includes network interface 606, which provides server 600 with access to external networks 616 and thereby external computing devices.

Server 600 further includes memory 608, which in this example includes receiving module 618, determining module 620, retrieving module 622, generating module 624, associating module 626, identifying module 628, displaying module 630, evaluating module 632, and content quality model 634 for performing operations described in FIGS. 1-3, 5.

Note that while shown as a single memory 608 in FIG. 7 for simplicity, the various aspects stored in memory 608 may be stored in different physical memories, but all accessible by CPU 602 via internal data connections such as bus 614.

Storage 610 further includes request data 636, which may be like the content requests described in FIGS. 1, 5.

Storage 610 further includes content items 638, which may be like the content items described in FIGS. 1-4.

Storage 610 further includes quality score 640, which may be like the quality score described in FIGS. 1-2, 5.

Storage 610 further includes featurization data 642, which may be like the features described in FIG. 2.

Storage 610 further includes label data 644, which may be like the labels described in FIG. 2.

Storage 610 further includes metadata 646, which may be like the metadata of a content item used to determine featurization data, as described in FIG. 2.

While not depicted in FIG. 6, other aspects may be included in storage 610.

As with memory 608, a single storage 610 is depicted in FIG. 6 for simplicity, but the various aspects stored in storage 610 may be stored in different physical storages, but all accessible to CPU 602 via internal data connections, such as bus 614, or external connection, such as network interface 606. One of skill in the art will appreciate that one or more elements of server 600 may be located remotely and accessed via a network.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A server may be implemented with a bus architecture. The bus may include any number of interconnecting buses and bridges depending on the specific application of the server and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the server depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the server to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    generating a set of ensemble models, wherein each ensemble model comprises a different combination of trained models, and wherein each trained model in the combination of trained models corresponds to a component;

receiving a content item that includes a set of components, retrieving the ensemble model that includes the combination of trained models that corresponds to the set of components of the content item;

for each component of the content item:
  generating a score via the corresponding trained model of the ensemble model, wherein the score is a probability the content item component matches a quality category;
  generating via the ensemble model a recommendation for the content item based on:
    calculating a content item score based on the score for each content item component, and
    determining the content item score meets a threshold requirement,
    wherein the recommendation includes a determination on how to handle the content item;
  storing the content item in a set of content items with the corresponding recommendation;
  upon receiving a request from a user:
    identifying a first set of keywords from the request based on a natural language analysis;
    determining a subset of content items from the set of content items corresponds to the request based on the first set of keywords from the request matching a second set of keywords associated with the subset of content items, the subset of content items including the content item;
    retrieving the subset of content items and the corresponding recommendations; and
    executing each recommendation corresponding to each content item in the subset of content items, including to display each content item in the subset of content items in ranking order that has a corresponding content item score that meets the threshold requirement.

2. The method of claim 1, wherein each model of the ensemble model is trained by:
  calculating a set of feature values for each content item component in a training data set, wherein each feature value is a numerical representation of an aspect of quality;
  retrieving a quality label generated by a content annotation tool for each content item component in the training data set indicating a quality of the content item component; and
  associating the set of feature values and the quality label for each content item component in the training data.

3. The method of claim 1, further comprises ranking the subset of content items.

4. The method of claim 1, further comprising:
  generating a recommendation to remove the content item;
  sending the recommendation to an authorized user;
  receiving authorization from the authorized user to remove the content item; and
  removing the content item from a database.

5. The method of claim 1, wherein a feature value of a content item component comprises one of:
  a sentiment score generated by a sentiment analysis;
  a number of words matching a set of words on a blocklist;
  a number of:
    spelling errors;
    punctuation errors; and
    grammar errors;
  a measurement of syntactic complexity;
  an average word frequency;
  a number of question keywords;
  a number of words in the content item component;
  a number of links within the content item component;
  a number representing an age of the content item component;
  a number representing an age of an account that generated the content item component; and
  a number representing content items associated with the account.

6. The method of claim 1, wherein:
  generating a recommendation to hide the content item; and
  blocking display of the content item based on the recommendation.

7. The method of claim 1, further comprising:
  generating a recommendation to edit the content item;
  sending the recommendation and the content item to an authorized user; and
  receiving an edited content item.

8. The method of claim 1, further comprising:
  generating in real time a score as the content item is generated;
  determining that the generated content item fails to meet a threshold requirement; and
  blocking the content item from being stored in a content database.

9. The method of claim 1, wherein a content quality model of the ensemble model includes a logistic regression model.

10. The method of claim 1, further comprises receiving the content item from a content database.

11. A system, comprising:
  a processor; and
  a memory storing instructions which when executed by the processor perform a method for managing content items, the method comprising:
    generating a set of ensemble models, wherein each ensemble model comprises a different combination of trained models, and wherein each trained model in the combination of trained models corresponds to a component;
    receiving a content item that includes a set of components;
    retrieving the ensemble model that includes the combination of trained models that corresponds to the set of components of the content item;
    for each component of the content item:
      generating a score via the corresponding trained model of the ensemble model, wherein the score is a probability the content item component matches a quality category;
      generating via the ensemble model a recommendation for the content item based on:
        calculating a content item score based on the score for each content item component, and
        determining the content item score meets a threshold requirement,
        wherein the recommendation includes a determination on how to handle the content item;
    storing the content item in a set of content items with the corresponding recommendation;
    upon receiving a request from a user:
      identifying a first set of keywords from the request based on a natural language analysis;
      determining a subset of content items from the set of content items corresponds to the request based on the first set of keywords from the request matching a second set of keywords associated with the subset of content items, the subset of content items including the content item;

retrieving the subset of content items and the corresponding recommendations; and executing each recommendation corresponding to each content item in the subset of content items, including to display each content item in the subset of content items in ranking order that has a corresponding content item score that meets die threshold requirement.

12. The system of claim 11, wherein each model of the ensemble model is trained by:

calculating a set of feature values for each content item component in a training data set, wherein each feature value is a numerical representation of an aspect of quality;

retrieving a quality label generated by a content annotation tool for each content item component in the training data set; and associating the set of feature values and the quality label for each content item component in the training data.

13. The system of claim 11, further comprises ranking the subset of content items.

14. The system of claim 11, further comprising:

generating a recommendation to remove a content item;

sending the recommendation to an authorized user;

receiving authorization from the authorized user to remove the content item; and removing the content item from a database.

15. The system of claim 11, wherein a feature value of a content item component comprises one of:

a sentiment score generated by a sentiment analysis;

a number of words matching a set of words on a blocklist;

a number of:

spelling errors;

punctuation errors; and grammar errors;

a measurement of syntactic complexity;

an average word frequency;

a number of question keywords;

a number of words in the content item component;

a number of links within the content item component;

a number representing an age of the content item component;

a number representing an age of an account that generated the content item component; and a number representing content items associated with the account.

16. The system of claim 11, wherein:

generating a recommendation to hide a content item; and blocking display of the content item based on the recommendation.

17. The system of claim 11, further comprising:

generating a recommendation to edit a content item;

sending of the recommendation and the content item to an authorized user; and receiving an edited content item.

18. The system of claim 11, further comprising:

generating in real time a score as a content item is generated;

determining that the generated content item fails to meet a threshold requirement; and blocking the content item from being stored in a content database.

19. The system of claim 11, wherein a content quality model includes a logistic regression model.

20. A method, comprising:

generating a set of ensemble models, wherein each ensemble model comprises a different combination of trained models, and wherein each trained model in the combination of trained models corresponds to a component;

receiving a content item that includes a set of components;

retrieving the ensemble model that includes the combination of trained models that corresponds to the set of components of the content item;

for each component of the content item:

generating a score via the corresponding trained model of the ensemble model, wherein the score is a probability the content item component matches a quality category;

generating via the ensemble model a recommendation for the content item based on:

calculating a content item score based on the score for each content item component, and determining the content item score does not meet a threshold requirement, wherein the recommendation includes a determination on how to handle the content item; and blocking the content item from a content database.

\* \* \* \* \*